United States Patent [19]

Shen

[11] Patent Number: 5,440,906
[45] Date of Patent: Aug. 15, 1995

[54] FIXING ARRANGEMENT FOR A CYLINDER MOUNTING BODY AND A FIXED HOOK MEMBER OF A VEHICLE STEERING WHEEL LOCK ASSEMBLY

[76] Inventor: Chao C. Shen, No. 62, Hoshan St., Tainan, Taiwan

[21] Appl. No.: 273,827

[22] Filed: Jul. 12, 1994

[51] Int. Cl.6 .............................................. B60R 25/02
[52] U.S. Cl. ........................................ 70/209; 70/226
[58] Field of Search ................. 70/209, 211, 212, 225, 70/226, 237, 238; D 8/330, 331, 339, 341, 343

[56] References Cited

U.S. PATENT DOCUMENTS

| | | | |
|---|---|---|---|
| 5,144,822 | 9/1992 | Jan et al. | 70/209 |
| 5,211,041 | 5/1993 | Hsu | 70/209 |

*Primary Examiner*—Lloyd A. Gall
*Attorney, Agent, or Firm*—Merchant, Gould, Smith, Edell, Welter & Schmidt

[57] ABSTRACT

A vehicle steering wheel lock includes a body having a cylinder mounted therein, a first hook member securely attached to a first end of the body, and a second hook member movably attached to a second end of the body. The first end of the body includes a hole therein and an annular groove in an outer periphery thereof. The first hook member includes an engaging end with a second annular groove defined in an outer periphery thereof. A sleeve is mounted to the first end of the body and has a longitudinal bore, a first end securely mounted in the first annular groove, and a second end mounted to the end edge of the first end of the body. An elastic retainer ring has an inner diameter slightly less than that of the bore of the sleeve. The retainer ring is mounted between an end edge of the first end of the body and the second end of the sleeve and is received in the second annular groove in the first hook member.

2 Claims, 3 Drawing Sheets

FIXING ARRANGEMENT FOR A CYLINDER MOUNTING BODY AND A FIXED HOOK MEMBER OF A VEHICLE STEERING WHEEL LOCK ASSEMBLY

BACKGROUND OF THE INVENTION

1. Field of the Invention

The present invention relates to a fixing arrangement for a cylinder mounting body and a fixed hook member of a vehicle steering wheel lock assembly.

2. Description of Related Art

A conventional vehicle steering wheel lock assembly includes a body in which a cylinder is mounted, a fixed hook member securely attached to a first end of the body, and a movable hook member attached to a second end of the body. The second hook member is movable in two directions away from and toward the first hook member when the cylinder is in an unlocked position and is movable in only one of the two directions when the cylinder is in a locked position. In use, the lock is mounted to a steering wheel by means of firstly securely hooking a hook on the fixed hook member to a point of a peripheral ring of the steering wheel. Then, with the cylinder in a locked position, the movable hook member is pulled away from the fixed hook member until a second hook on the movable hook member is tightly hooked to another point on the peripheral ring of the steering wheel.

The fixed hook member must be firmly attached to the body; otherwise these two parts may be detached by an unauthorized person by means of breaking the connection therebetween. For this reason the body has a flange in a bore defined in the first end thereof, and the fixed hook member has an annular groove on an end thereof for securely engaging with the flange. However, the body can only be produced by means of two half pieces instead of cheap precasting since there is a flange in it. More specifically, the manufacturers must produce two half pieces by molding, and in assembly, the cylinder and the engaging end of the fixed hook member are firstly positioned in the two half pieces which are then welded together for subsequent polishing. This is high in cost and is troublesome in manufacture and assembly. Moreover, the fixed hook member has a considerable length which causes problems in welding and further processing which is time-consuming and results in an increase in cost.

Although a body integrally formed by precasting and utilizing a retainer to secure the fixed hook member to the body has been proposed, such a retainer can be easily destroyed as it is exposed outside, resulting in malfunction of the steering wheel lock assembly.

Therefore, there has been a long and unfulfilled need for a steering wheel lock assembly with an improved connection arrangement between the fixed hook member and the cylinder mounting body.

SUMMARY OF THE INVENTION

A vehicle steering wheel lock assembly provided by the present invention includes! a body having a cylinder mounted therein, a first hook member securely attached to a first end of the body, and a second hook member movably attached to a second end of the body. The first end of the body includes a hole therein and an annular groove in an outer periphery thereof. The first hook member includes an engaging end with a second annular groove defined in an outer periphery thereof. A sleeve is mounted to the first end of the body and has a longitudinal bore, a first end securely mounted in the first annular groove, and a second end mounted to the end edge of the first end of the body. An elastic retainer ring has an inner diameter slightly less than that of the bore of the sleeve. The retainer ring is mounted between the end edge of the first end of the body and the second end of the sleeve and is received in the second annular groove in the first hook member.

Preferably, the first end of the body includes a protrusion projecting from an inner end wall thereof which defines the hole and the engaging end of the first hook member has with a notch for engaging with the protrusion for preventing rotational movement of the first hook member.

Other objects, advantages, and novel features of the invention will become more apparent from the following detailed description when taken in conjunction with the accompanying drawings.

DESCRIPTION OF THE PREFERRED EMBODIMENT

Figure 1:
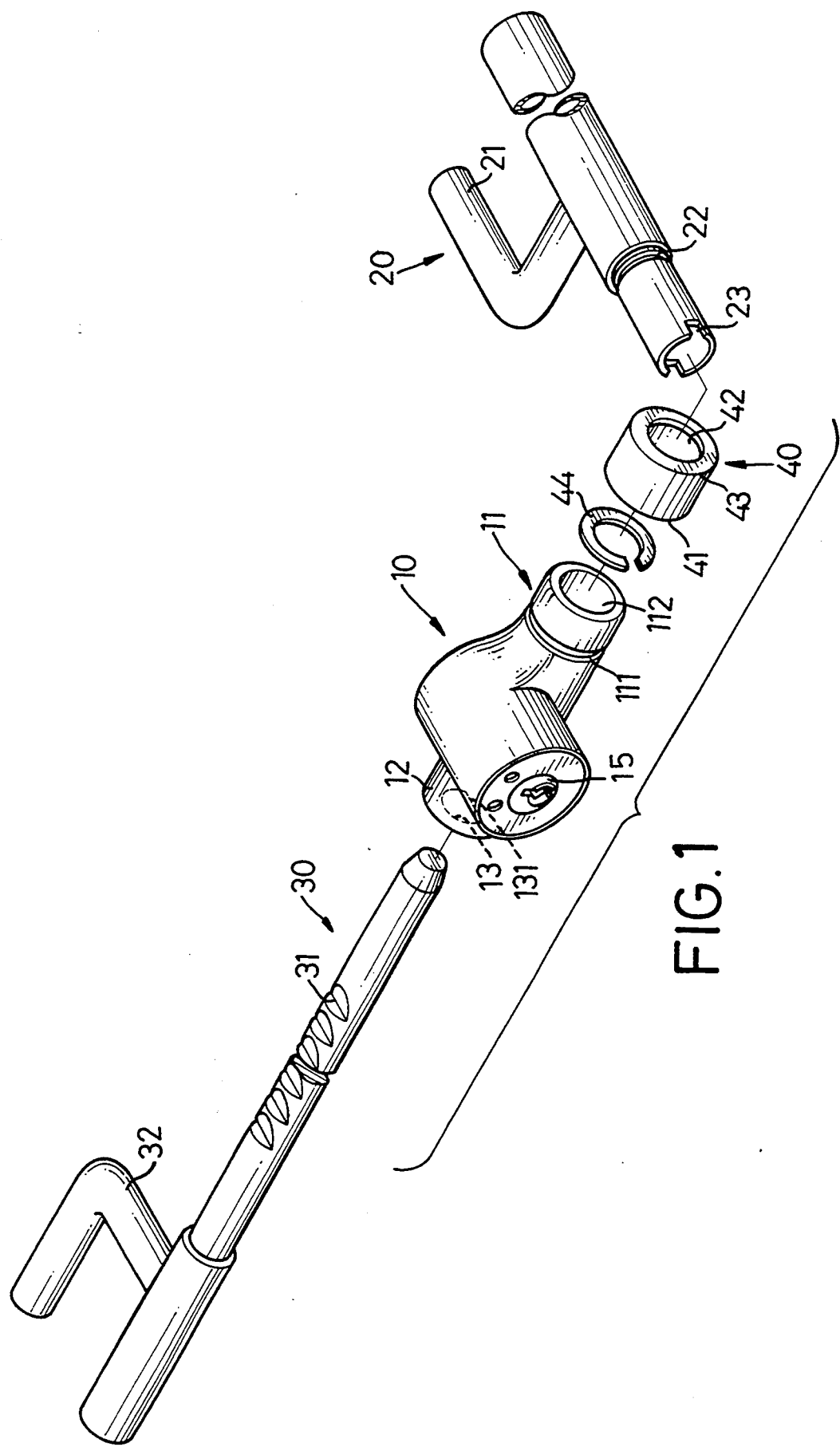
FIG. 1 is an exploded view of a vehicle steering wheel lock assembly in accordance with the present invention.

Referring to the drawings and initially to FIG. 1, a vehicle steering wheel lock in accordance with the present invention generally includes a body 10 in which a cylinder 15 and transmission parts are mounted, a first hook member 20 securely attached to a first end 11 of the body 10, and a second hook member 30 movably attached to a second end 12 of the body 10. The second end 12 of the body 10 has a bore 13 with a flat bottom side 131. The second hook member 30 has a hook 32 which extends away from the body and a plurality of teeth 31 for releasably engaging with the transmission parts in the body. The second hook member 30 has a cross-sectional configuration the same as that of the bore 13 such that the second hook member 30 may slide along the bore 13 yet rotational movement thereof is prohibited. The second hook member 30 is movable in two directions away from and toward the first hook member 20 when the cylinder 15 is in an unlocked position and is movable in only one of the two directions when the cylinder 15 is in a locked position, which is conventional and therefore will not be described further.

Figure 2:
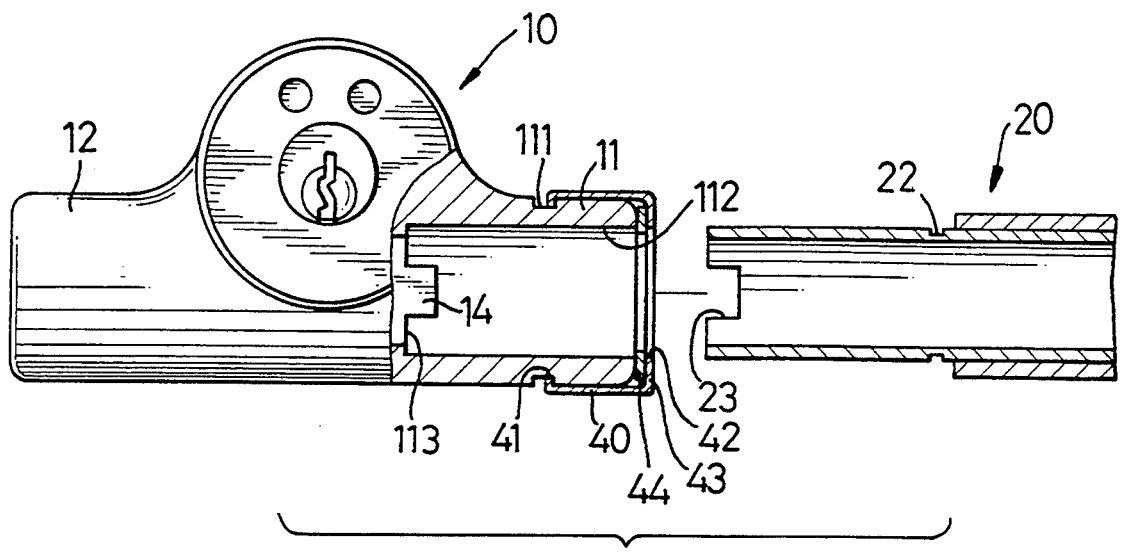
FIG. 2 is a front elevational view, partly in section, illustrating assembly of a fixed hook member to a mounting body of the steering wheel lock assembly.

Still referring to FIG. 1 and further to FIG. 2, the first end 11 of the body 10 includes a blind hole 112 therein, an annular groove ill in an outer periphery thereof, and a pair of protrusions 14 projecting from an inner end wall 113 which defines the blind hole 112. The first hook member 20 includes a hook 21 which also extends away from the body 10 and an engaging end with a pair of notches 23 for engaging with the protrusions 14 and a second annular groove 22 defined in an outer periphery thereof. The lock further includes a retainer ring 44 and a sleeve 40 having a longitudinal bore 42 defined by a flange [not labelled], an open end 41, and a periphery 43. It is appreciated that the retainer ring 44 is elastic and has an inner diameter slightly less than that of the bore 42 of the sleeve 40 (see FIG. 2).

Figure 3:
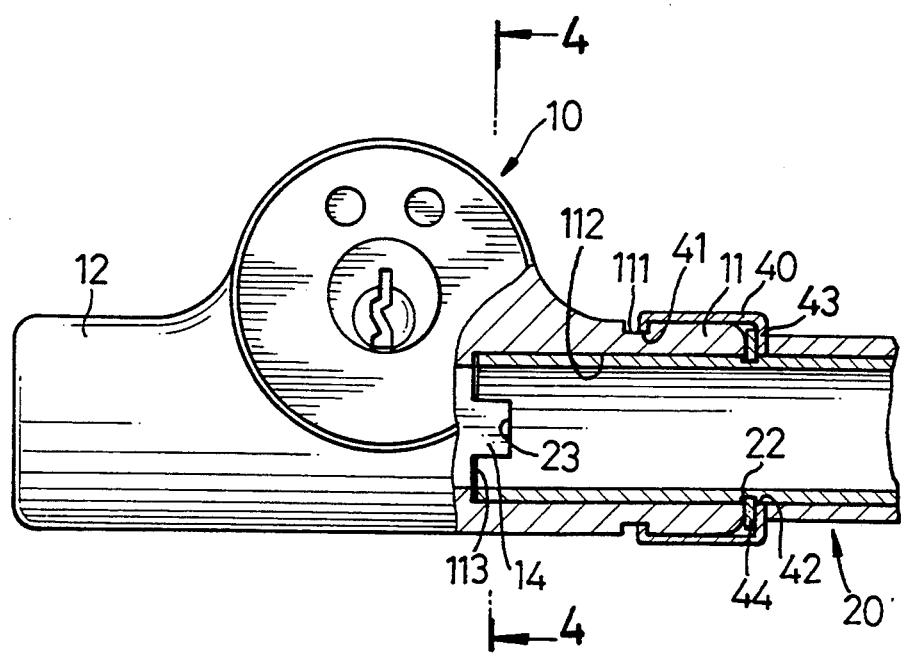
FIG. 3 is a partially sectioned front elevational view of the assembled fixed hook member and the mounting body.
Figure 4:
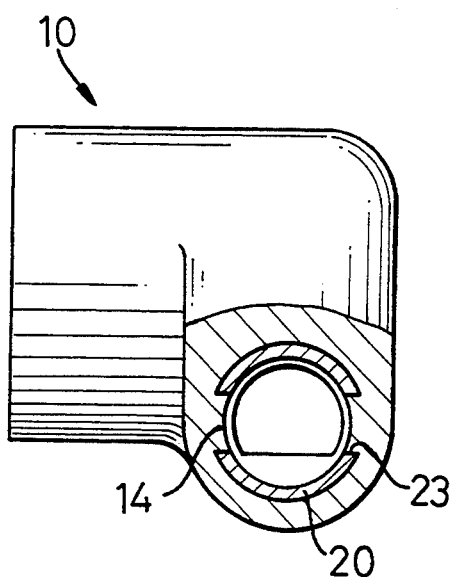
FIG. 4 is a side elevational view, partly in section, showing the assembled fixed hook member and the mounting body.

In assembly, referring to FIGS. 1 and 2, the retainer ring 44 is firstly received in the sleeve 40 at a position distal to the open end 41. Then, the sleeve 40 is mounted to the first end 11 of the body 10 with the open end 41 thereof deformed into the annular groove 111 in the outer periphery of the first end 11, as shown in FIG. 3, and in which the retainer ring 44 is positioned between the end-edge of the first end 11 and the other end of the sleeve 44. Thereafter, the first hook member 20 is inserted into the first end 11 of the body 10 (the elastic retainer ring 44 is expanded) until the notches 23 engage with the protrusions 14 and the retainer ring 44 is received in annular groove 22. By this arrangement, the first hook member is securely attached to the body 10 with the retainer ring 44 hidden in the sleeve 40, such that the body 10 can be integrally formed by precasting thereby reducing the cost. Furthermore, the provision of the notches 23 and protrusions 14 prohibits rotational movement of the first hook member 20 which may damage the lock assembly.

Although the hook members 20 and 30 in this embodiment are both mounted to the steering wheel, it is appreciated that the hooks 21 and 31 thereon may be arranged to locate at distal ends thereof and face with each other such that one hook may be hooked on the steering wheel while the other hook is hooked on the pedal.

Although the invention has been explained in relation to its preferred embodiment, it is to be understood that many other possible modifications and variations can be made without departing from the spirit and scope of the invention as hereinafter claimed.

I claim:

1. A vehicle steering wheel lock assembly comprising:
   a body having a cylinder mounted therein and first and second ends, said first end of said body including a hole therein, a first annular groove in an outer periphery thereof, and an end edge;
   a first hook member securely attached to said first end of said body, said first hook member including an engaging end with a second annular groove defined in an outer periphery thereof;
   a sleeve mounted to said first end of said body and having a longitudinal bore, a first end securely mounted in said first annular groove, and a second end mounted to said end edge of said first end of said body;
   an elastic retainer ring having an inner diameter slightly less than that of said bore of said sleeve, said retainer ring being mounted between said end edge of said first end of said body and said second end of said sleeve and received in said second annular groove in said first hook member; and
   a second hook member movably attached to said second end of said body, said second hook member being movable in two directions away from and toward said first hook member when the cylinder is in an unlocked position and is movable in only one of said two directions when the cylinder is in a locked position.

2. The vehicle steering wheel lock assembly as claimed in claim 1 wherein said first end of said body includes a protrusion projecting from an inner end wall thereof which defines said hole, and said engaging end of said first hook member has a notch for engaging with said protrusion for preventing rotational movement of said first hook member.

* * * * *